United States Patent
Wittkopf et al.

(10) Patent No.: US 9,303,578 B2
(45) Date of Patent: Apr. 5, 2016

(54) THROTTLE BODY FUEL INJECTION SYSTEM WITH IMPROVED IDLE AIR CONTROL

(75) Inventors: Michael Anthony Wittkopf, El Paso, TX (US); Todd Alan Petersen, Scottsdale, AZ (US)

(73) Assignee: MSD LLC, El Paso, TX (US)

( * ) Notice: Subject to any disclaimer, the term of this patent is extended or adjusted under 35 U.S.C. 154(b) by 688 days.

(21) Appl. No.: 13/469,938

(22) Filed: May 11, 2012

(65) Prior Publication Data
US 2013/0298868 A1 Nov. 14, 2013

(51) Int. Cl.
| | |
|---|---|
| *F02D 9/08* | (2006.01) |
| *F02D 41/08* | (2006.01) |
| *F02D 41/40* | (2006.01) |
| *F02D 11/10* | (2006.01) |
| *F02D 31/00* | (2006.01) |
| *F02M 23/04* | (2006.01) |
| *F02M 69/04* | (2006.01) |
| *F02M 69/32* | (2006.01) |
| *F02D 41/14* | (2006.01) |

(52) U.S. Cl.
CPC ............... *F02D 41/08* (2013.01); *F02D 11/10* (2013.01); *F02D 31/008* (2013.01); *F02D 41/40* (2013.01); *F02M 23/04* (2013.01); *F02D 2041/141* (2013.01); *F02M 69/043* (2013.01); *F02M 69/32* (2013.01); *Y02T 10/44* (2013.01)

(58) Field of Classification Search
CPC .... F02D 31/005; F02D 41/083; F02D 31/003
USPC ......... 123/336, 337, 427, 323, 361, 328, 399, 123/470–472, 339.1, 339.12, 339.14, 123/339.23; 60/324, 292, 287, 295
See application file for complete search history.

(56) References Cited

U.S. PATENT DOCUMENTS

| | | | |
|---|---|---|---|
| 4,348,338 A | 9/1982 | Martinez et al. | |
| 5,200,900 A | 4/1993 | Adrain et al. | |
| 5,523,948 A | 6/1996 | Adrain | |
| 5,809,972 A | 9/1998 | Grant | |
| 6,467,465 B1 * | 10/2002 | Lorts | ............................. 123/527 |
| 7,156,073 B2 * | 1/2007 | Kure | ............................. 123/337 |
| 7,191,755 B2 * | 3/2007 | Vint | ........................ 123/339.26 |
| 7,735,475 B2 | 6/2010 | Farrell et al. | |

(Continued)

OTHER PUBLICATIONS

Professional Products: Powerjection™ III, Instructions & User Manual for 70020, 70021, 70026, & 70027 Kits and 70028, 70029 plus 70120 through 70129 Kits; Copyright 2010 www.professional-products.com.

*Primary Examiner* — Thomas Moulis
*Assistant Examiner* — Joseph Dallo
(74) *Attorney, Agent, or Firm* — Standley Law Group LLP

(57) ABSTRACT

A single point fuel injection throttle body assembly including an idle air control circuit having an port opening into main intake bores downstream of the point of fuel distribution into the air stream. When the idle air control circuit is open, an air/fuel mixture, rather than simply air, is drawn into the into the intake manifold, thereby reducing the tendency for a lean fuel mixture at idle. A unique engine control unit "feed forward" algorithm controls the fuel injection as a function of the position of the idle air control motor so that as the idle air control circuit is opened, the pulse widths of the fuel injector signals are increased. This feature allows the initial open-loop-based fuel mixture supplied by system to be more accurate and eliminates rough unstable idle associated with closed-loop control lag times.

15 Claims, 7 Drawing Sheets

(56) References Cited

U.S. PATENT DOCUMENTS

| | | | |
|---|---|---|---|
| 2004/0187920 A1* | 9/2004 | Schmidt et al. | 137/15.25 |
| 2007/0040143 A1* | 2/2007 | Garrick | 251/305 |
| 2009/0024301 A1* | 1/2009 | Volpato | 701/103 |
| 2010/0018024 A1* | 1/2010 | Garrick | 29/402.19 |

* cited by examiner

THROTTLE BODY FUEL INJECTION SYSTEM WITH IMPROVED IDLE AIR CONTROL

BACKGROUND OF THE INVENTION

1. Field of the Invention

This invention relates generally to fuel injection systems for internal combustion engines, and in particular to single point throttle body fuel injection systems designed for retrofitting vintage carburetion fuel delivery systems.

2. Background Art

A carburetion fuel delivery system uses a carburetor to supply and meter the mixture of fuel and air in relation to the speed and load of the engine. FIG. 1 illustrates a typical carburetor (10). Carburetor (10) includes one or more barrels (12). A butterfly-type throttle valve (18) is located near the bottom of the barrel (12), the opening and closing of which is controlled through a throttle linkage (not illustrated). Each barrel (12) includes a primary venturi (14) and an annular boost venturi (16), although additional venturis may be used to permit more precise metering of fuel and air under different conditions. Liquid fuel (20) is contained in a float bowl (22) and is in fluid communication with one or more orifices (21) located at the throat within the annular venturi (16). A jet (24) having a selectively sized port formed therethrough is disposed within the float bowl (22) at the entrance to the fluid passage (25) between the float bowl and the venturi (16). As air flows through the barrel (12) during operation of the engine (depicted using single-headed arrows), a low pressure develops at the throats of the venturis (14, 16) according to Bernoulli's law. The difference in pressure at the fuel across fluid passage (25) causes fuel to flow into the air stream (depicted using double-headed arrows). Orifices (21) atomize the liquid fuel, and because of the low pressure created by venturis (14, 16), the fuel is nearly instantaneously vaporized. The size of jet (24) determines the air/fuel ratio.

Variations in atmospheric temperature and pressure, engine temperature, load and speed make perfect carburetion nearly impossible to obtain under all driving conditions. A cold engine, an engine at idle, and an engine at wide-open throttle all require a rich fuel-air mixture, while a warm engine at cruise requires a lean fuel-air mixture. The airflow also varies greatly; the airflow through the carburetor at wide-open throttle may be 100 times greater than the airflow at idle. Complicating matters is the fact that gasoline has components with widely varying boiling points, which may result in less than fully vaporized fuel entering the engine cylinders under certain conditions, particularly when the intake manifold is cold.

In contrast, fuel injection systems meter fuel much more precisely than carburetors, thereby allowing optimal fuel-air mixture to be more consistently delivered across the full spectrum of driving conditions. Fuel injection provides increased horsepower, higher torque, improved fuel economy, quicker cold starting, and other benefits. As a result, fuel injection systems have largely replaced carburetion fuel delivery systems in automobiles manufactured after 1985.

Fuel injection systems use one or more fuel injectors, which are electromechanical devices that meter and atomize fuel. In each injector, application of an electrical current to a coil lifts a spring-loaded needle within a pintle valve off its seat, thereby allowing fuel under pressure to be sprayed through an injector nozzle to form a cone pattern of atomized fuel.

Fuel injection systems may be classified as single point, multi-point, or direct injection. As illustrated in FIG. 2, single point injection, also known as throttle body injection, uses one or more fuel injectors (64) located generally in a single location the throttle body (62). Fuel is sprayed into throttle body (62) for delivery to the cylinders via the intake manifold (not illustrated). Fuel injectors (64) may be of the continuous injection variety, for which fuel is sprayed continuously and fuel delivery is controlled by adjusting fuel pressure, or of the intermittent injection variety, for which the injectors are rapidly cycled on and off and fuel delivery is controlled by the duration of the "on" pulse within a cycle. The latter variety is preferable for electronic control.

Although mechanical and hydraulic control systems are also known in the art, electronic control is the most common manner for governing the rate of fuel injection. A microprocessor- or microcontroller-based computer system is included within an engine control unit (ECU). The computer controls various engine and automotive systems as preprogrammed functions of numerous signals received from various sensors.

For control of fuel injection, the computer generates periodic pulse signals for each of the injectors, with "on" pulses for firing the fuel injectors. One or more driver circuits, located within the ECU, amplify and condition the pulse signals to be suitable for use with the fuel injectors. The cycle wavelength is a function of engine speed, and the pulse widths of the "on" pulses are a function of engine load. Engine speed is typically determined by a distributor output, a tachometer output, or a crankshaft sensor. Engine load is typically determined with either a mass airflow sensor or a manifold absolute pressure (MAP) sensor.

Based on the engine speed and load input signals, the computer generates the fuel injector pulse signals. The fuel injector pulse signals are initially based on target air-fuel ratio values, which are compensated for the volumetric efficiency of the engine at its operating speed and load. Target air-fuel ratios and volumetric efficiency coefficients may be stored in one or more look-up tables in volatile or non-volatile computer memory and are accessed using engine load and speed as input indices. The use of look-up tables allows for rapid response by the ECU to various vehicle operating conditions without the need for extensive time-consuming calculations. Controlling the fuel injection directly from the look-up tables is referred to as open-loop control.

However, when the ECU operates in a closed-loop control mode, the actual fuel injector pulse signals may vary from those derived directly from the look-up tables based on actual engine operating conditions. In closed-loop control, the amount of oxygen present in the exhaust gas is measured, which provides an indication of whether the engine is running too rich, too lean, or stoichiometrically. The fuel rate supplied to the engine is corrected by the ECU based on the input from an oxygen sensor so that the actual air-fuel ratio supplied to the engine equals the stored target air-fuel ratio under all conditions. In some ECU systems, one or more look-up tables may be updated based on the corrections derived during closed-loop control for better open-loop and closed-loop control. Closed-loop control is not used under some conditions, such as when the exhaust gas temperature is too cold for the oxygen sensor to provide reliable data.

There are a number of enthusiasts who operate vintage automobiles, often muscle cars, hotrods, and the like, who would benefit from upgrading the original carburetion fuel delivery systems with fuel injection systems. There is a desire, however, to maintain the traditional clean look, feel, and simplicity of a carburetor mounted atop the intake manifold. Throttle body fuel injection systems are ideal for such applications. Accordingly, a niche market has evolved for kits to adapt existing carburetors with injection capability or to replace existing carburetors with bolt-in-place throttle body fuel injection systems. Although such retrofit products exist, which provide many benefits of fuel injection, there is room for improvement in the way that fuel and air are delivered and mixed within the throttle body assembly.

For example, FIG. 2 is a perspective view of a throttle body fuel injection system (60) of prior art for replacing a carburetor, such as that disclosed by U.S. Pat. No. 7,735,475 issued to Farrell et al. on Jun. 15, 2010. A section of the throttle body (62) is broken out to reveal the structure of one of the air intake barrels or bores (72), a throttle valve (78), and the idle air control (IAC) circuit (80). The fuel injectors (64) are positioned so as to inject the fuel just above the throttle valve blades (78). The idle air circuit intake (82) is located at the top of the throttle body (62), and the outlet (84) is located at the bottom of the throttle body (62). An idle air controller motor (86) is connected to an IAC valve assembly (88) so as to allow air flow through the IAC circuit (80).

The Farrell et al. device positions the fuel injectors (64) just above the throttle blades (78) "to direct fuel to cover the upper surface of the throttle blade to improve fuel atomization." U.S. Pat. No. 7,735,475, col. 3 ll. 58-59. Other designs, such as those disclosed by U.S. Pat. No. 5,809,972 issued to Grant on Sep. 22, 1998 or U.S. Pat. No. 4,348,338 issued to Martinez et al. on Sep. 7, 1982, utilize venturis akin to carburetor annular boost venturis (16) of FIG. 1 to create low pressure zones to improve atomization and vaporization of injected fuel. However, these designs may not provide optimal atomization and mixture delivery to each engine cylinder. Indeed, the use of venturis with concomitant low pressure zones in fuel injection systems has disadvantages, including imprecise fuel delivery due to the propensity to draw fuel out of the fuel passages downstream of the injectors during "off" periods in the fuel injection cycle and a greater risk for the accumulation of icing within the throttle body under certain conditions.

As another example, the Farrell et al. IAC circuit (80) is completely separate from the intake barrels (72). As a result, idle air flowing through the IAC circuit (80) is not mixed with fuel. For this reason, the mixture tends to be too lean during idle conditions, causing rough unstable idle. Analogously, in ECU systems of prior art, fuel injection and IAC algorithms are also independent of one another. IAC motor position is controlled primarily as a function of engine speed, and sometimes, coolant temperature. Additional inputs, such as manifold absolute pressure or throttle position, may also be considered to ensure that the engine is actually in an idle condition prior to actuating the IAC motor. Fuel injector pulsing is controlled primarily as a function of engine speed, engine load, exhaust oxygen levels, and sometimes manifold air temperature (for air density compensation), coolant temperature (i.e., for simulating carburetor choke function) or throttle position (i.e., for simulating carburetor accelerator pump circuit operation). Fuel injector pulsing is not a function of IAC motor position. As the IAC opens when the engine begins to idle, the fuel delivered to the engine, initially based on the open-loop look-up tables, becomes too lean. The ECU compensates for the lean idle condition during closed-loop control by measuring post-combustion oxygen levels, but any corrective feedback necessarily lags engine operation under undesirably lean conditions.

3. Identification of Objects of the Invention

A primary object of the invention is to provide a fuel injection system for internal combustion engines that provides superior performance with optimal fuel distribution and idle control circuitry.

Another object of the invention is to provide an electronic fuel injection control system that provides superior performance during idle conditions.

Another object of the invention is to provide a fuel injection system for retrofitting carbureted engines that installs easily with minimal external connections.

SUMMARY OF THE INVENTION

The objects described above and other advantages and features of the invention are incorporated in a throttle body fuel injection system and method that is designed and arranged to easily replace four-barrel carburetors. The system preferably includes a throttle body assembly with four main bores, each with a throttle plate and an associated fuel injector, left and right fuel rails, and an engine control unit that is integrated into the side of throttle body. Each injector feeds fuel into a circular fuel distribution ring via a fuel injection conduit, which introduces pressurized fuel into the air stream. Both the main bores and the fuel distribution rings have profiles that avoid constrictions to prevent low pressure zones according to the Venturi effect. That is, the throttle body according preferred embodiments of the invention avoids using a venturi or the venturi effect to accomplish fuel distribution. Fuel is injected through downward-facing outlets at or near the bottom end of the ring.

In a preferred embodiment, the fuel distribution ring is a two-piece ring formed of a ring-shaped insert pressed into a ring-shaped outer housing. The outer housing is ideally integrally formed with the throttle body casting and includes one or more radial spokes to connect to the walls of the bore. At least one spoke for each ring includes a fuel injection conduit that supplies the ring with fuel from an injector. The insert includes axial grooves intervaled about its exterior circumference of insert that are joined by a circumferential groove formed about the insert. The grooves are in fluid communication with the fuel injection conduit.

The throttle body assembly includes an idle air control circuit that bypasses throttle blades. The idle air control circuit has an inlet port at the top of the throttle body and an outlet port at the bottom of throttle body. A cross-over port joins the idle air control circuit to one or more bores within the throttle body below the fuel distribution ring. An idle air control motor is used to throttle the amount of air that flows through the idle air control bypass circuit by varying the stem of an idle air control valve between open and shut positions. When the idle air control valve is open, an air/fuel mixture is drawn into the into the intake manifold through the idle air control circuit from the region of the throttle body bores downstream of the fuel injection rings. Because an air fuel mixture rather than air is supplied at idle, the tendency for a lean idle fuel mixture is minimized.

Additionally, a unique engine control unit "feed forward" algorithm controls the fuel injection as a function of the position of the idle air control motor so that as the IAC valve is opened, the pulse widths of the fuel injector signals are increased. This feature allows the initial open-loop-based fuel mixture supplied by system to be more accurate and eliminates rough unstable idle associated with closed-loop control lag times.

BRIEF DESCRIPTION OF THE DRAWINGS

The invention is described in detail hereinafter on the basis of the embodiments represented in the accompanying figures, in which.

DESCRIPTION OF THE PREFERRED EMBODIMENT OF THE INVENTION

Figure 3:
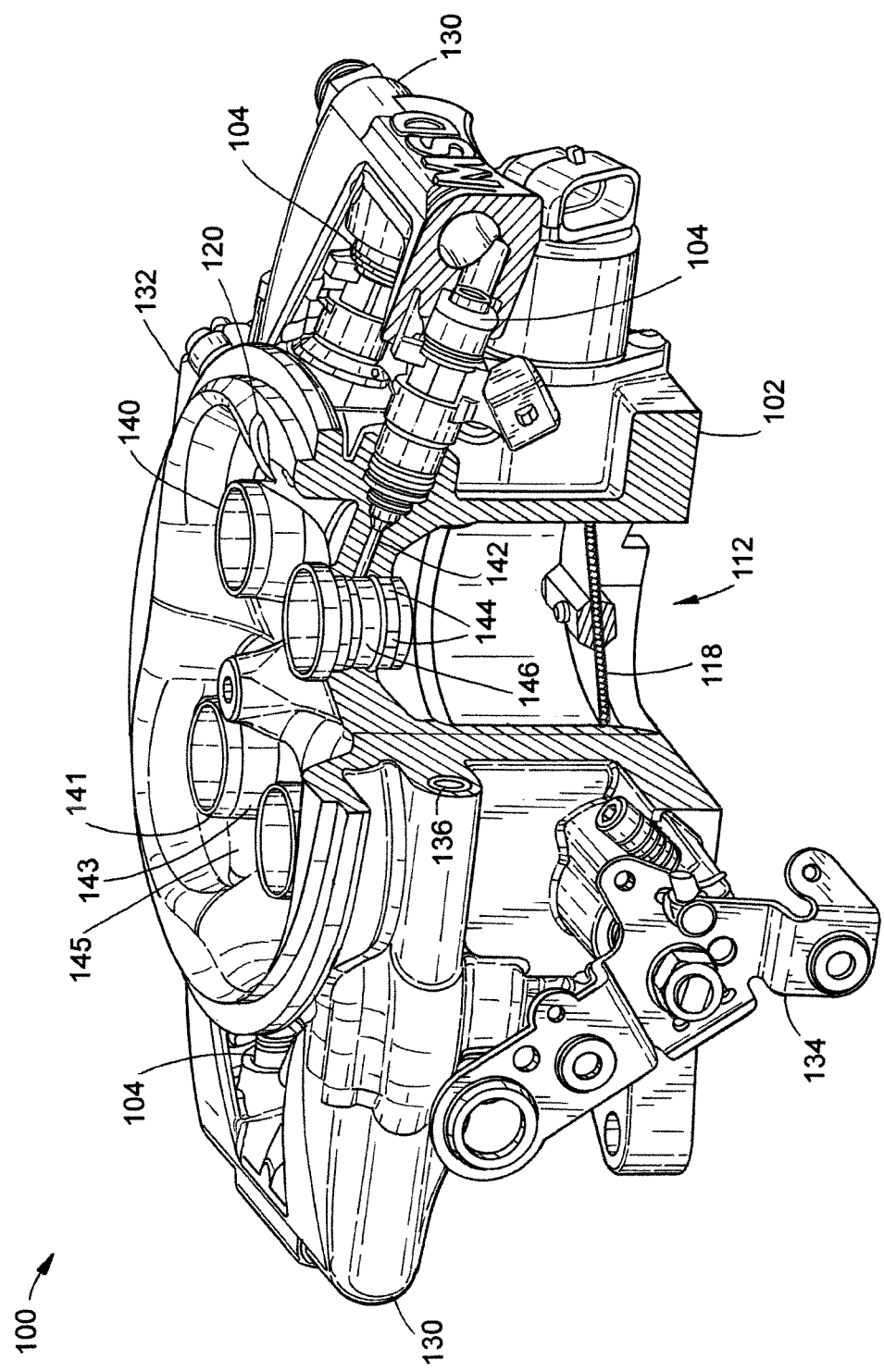
FIG. 3 is a perspective view of a throttle body fuel injection system with a broken-out section to reveal the detail of an annular fuel distribution ring according to a preferred embodiment of the invention.
Figure 4:
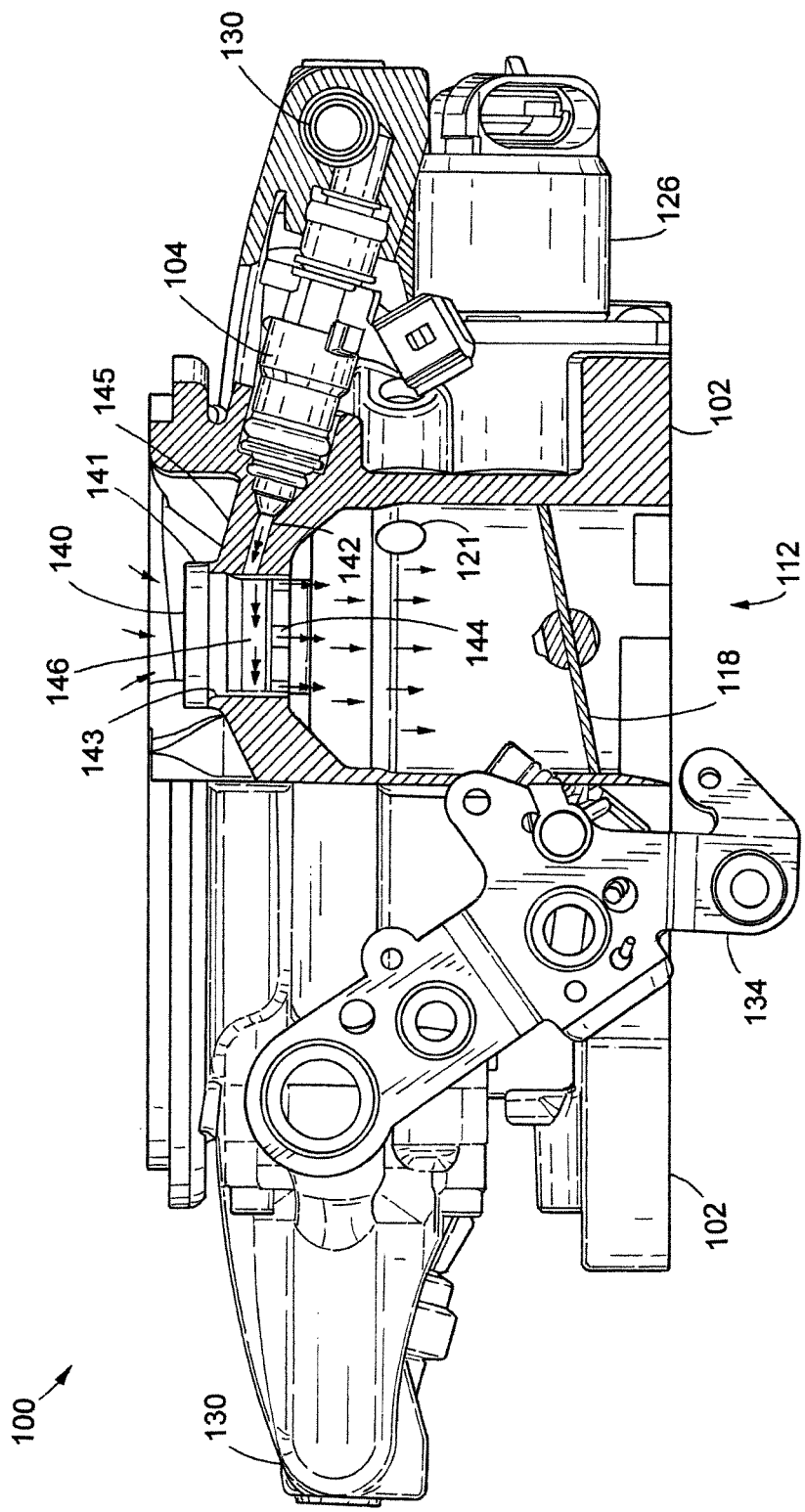
FIG. 4 is a side elevation of the throttle body fuel injection system of FIG. 3.
Figure 5:
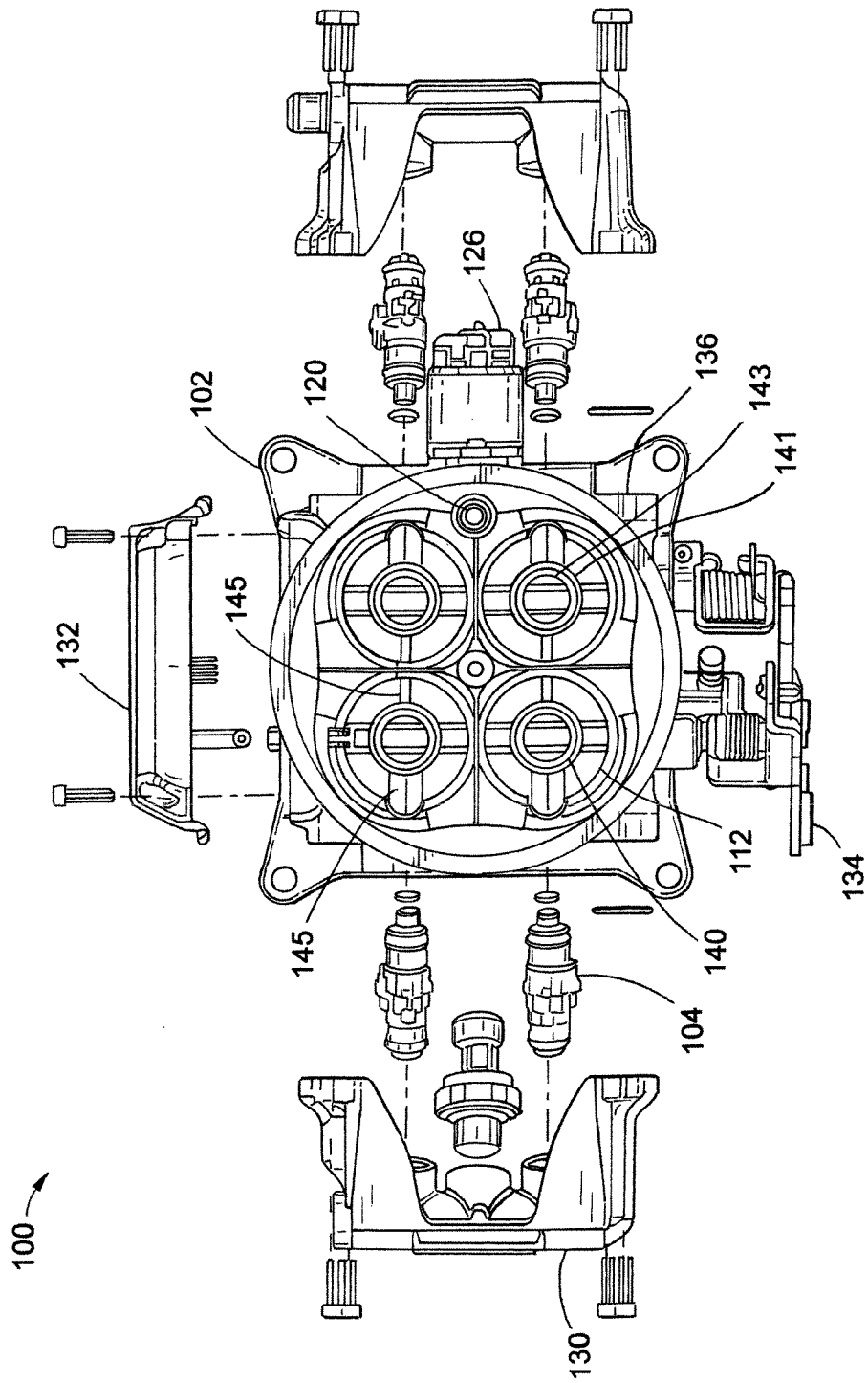
FIG. 5 is a top plan view exploded diagram of the throttle body fuel injection system of FIG. 3.

FIGS. 3-5 illustrate a throttle body fuel injection system 100 according to a preferred embodiment of the invention. Throttle body fuel injection system 100 is a preferably an electronic fuel injection system that is designed and arranged to easily replace four-barrel carburetors. Throttle body 100 is designed to bolt on to any square-bore, four-barrel intake, including the common 4150 and 4160 designs. These intake manifold configurations are found on numerous engines for muscle cars and hot rods, including small and big block engines manufactured by Ford, General Motors, and Mopar. There are also aftermarket intake manifolds available to convert LS engines.

System 100 includes a throttle body 102 with four main bores 112 (each with a throttle plate 118), left and right fuel rails 130, and an engine control unit (ECU) 132 that is integrated into the side of throttle body 102 opposite the throttle linkage (134). The fuel is fed into one of the fuel rails 130, which is connected to the opposite fuel rail via a passage 136 formed within the throttle body. The fuel rails 130 provide fuel to four fuel injectors 104, which are preferably located above the throttle plates 118. Ideally, there is one fuel injector 104 per bore 112.

Figure 1:
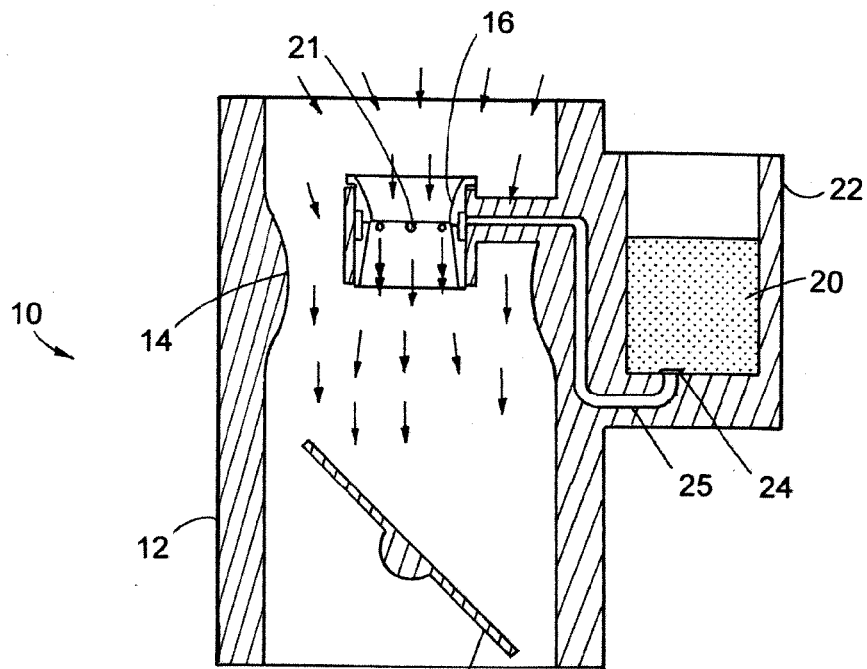
FIG. 1 is an axial cross-section of the barrel of a typical carburetor of prior art, showing primary and annular booster venturis for drawing fuel from a float bowl into the air stream.

Each injector 104 feeds fuel into a circular fuel distribution ring 140 via a fuel injection conduit 142. Fuel distribution ring 140 introduces pressurized fuel into the air stream. Note that unlike the carburetor annular booster venturis 16 of FIG. 1, fuel distribution rings 140 have profiles that do not form constrictions for creating low pressure zones according to the Venturi effect. Indeed, the inner and outer diameters of fuel distribution rings 140 have substantially straight sides for minimal pressure drop. Also unlike the carburetor annular booster venturis 16 of FIG. 1, in which the fuel is introduced into the air stream through orifices 21 located in the interior side wall of the ring, fuel is injected through downward-facing outlets at or near the bottom end of ring 140.

In a preferred embodiment, ring 140 is a two-piece ring formed of a ring-shaped insert 141 pressed into a ring-shaped outer housing 143. Outer housing 143 is ideally integrally formed with the throttle body casting and includes one or more radial spokes 145 protruding therefrom that connect to the walls of bore 112 for securing outer ring housing 143 within bore 112. At least one spoke 145 for each ring 140 includes a fuel injection conduit 142 that supplies ring 140 with fuel from an injector 104. Insert 141 fits within outer housing 143. Insert 141 includes axial grooves 144 intervaled about the exterior circumference of insert 141. A circumferential groove 146 formed about insert 141 fluidly connects axial outlet grooves 144 with fuel injection conduit 142, thereby allowing fuel to flow from injector 104 through conduit 142, through circumferential groove 146, and through axial grooves 144 to discharge downwardly at or near the bottom end of ring 140. Although axial grooves 144 and circumferential groove 146 are shown formed in insert 141, in an alternative embodiment either the axial grooves, the circumferential groove, or both, may be formed within the interior of outer housing 143.

The design of annular injection ring 140 produces an air/fuel charge with superior mixing for even distribution to the cylinders. Better air-fuel mixing provides for better idle quality, better starting, and better overall drivability throughout the engine rpm range. According to a preferred embodiment of the invention, each injection ring 140 includes six axial outlets 144, although a greater or lesser number can be used as desired. However, it is desirable that the total cross-sectional area of axial grooves 144 within each injection ring 140 be larger than the total cross-sectional area exiting the corresponding fuel injector 104 so as to lower the kinetic energy of the fuel droplets entering the air stream. In a preferred embodiment, the total cross-sectional area of axial grooves 144 is approximately fifty percent larger than the area exiting fuel injector 104.

Figure 6:
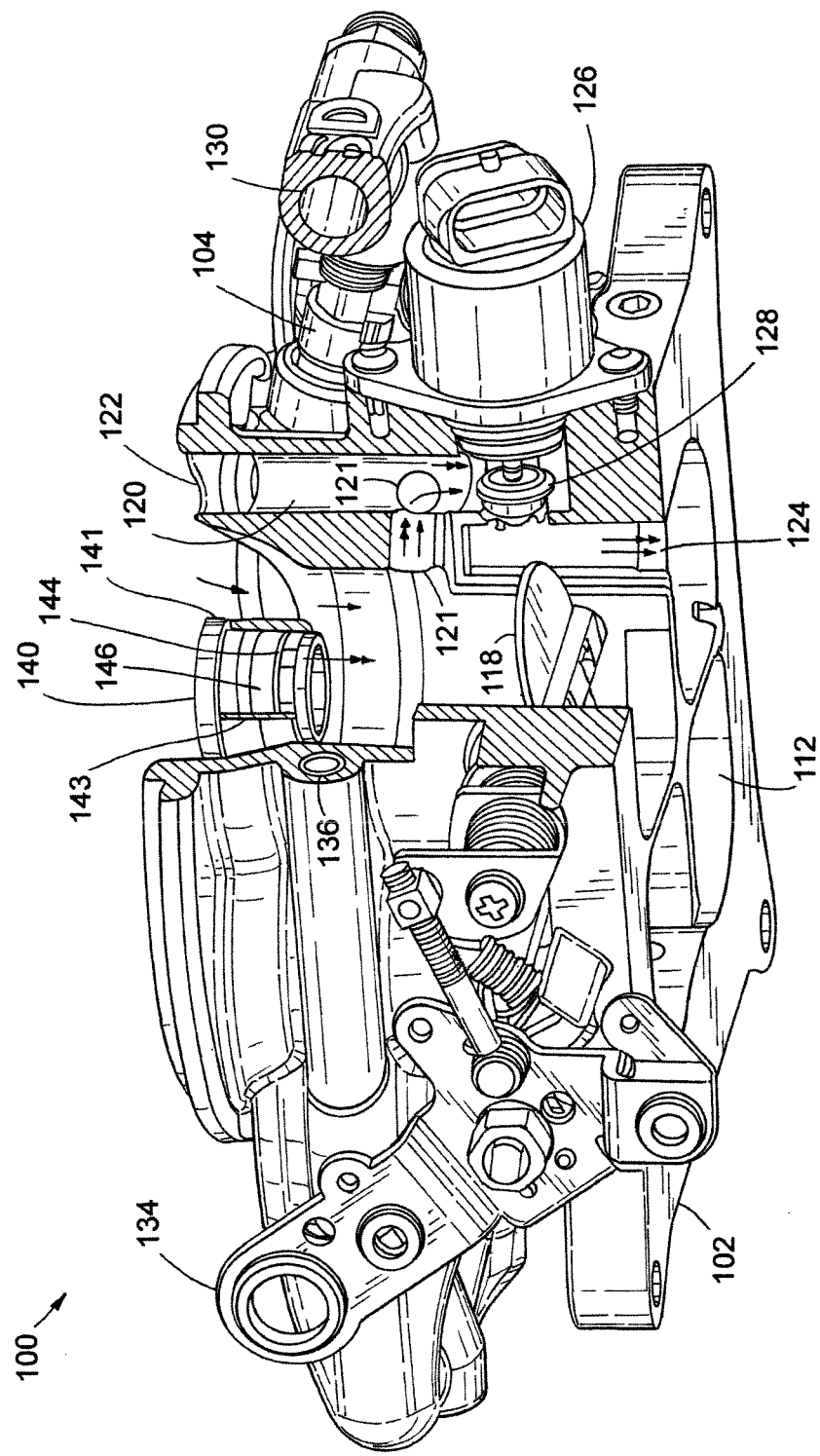
FIG. 6 is a perspective view of the throttle body fuel injection system of FIG. 3 shown with a larger broken-out section to reveal the detail of an idle air control arrangement according to a preferred embodiment of the invention.

FIG. 6 illustrates the idle air control (IAC) circuitry 120 of fuel injection system 100 according to a preferred embodiment of the invention. Like the IAC circuitry 80 of the prior art throttle body fuel injection system of FIG. 2, IAC circuitry 120 bypasses throttle blades, which are shut when the engine is idling (although a closed throttle still allows a small amount of air to enter the manifold). IAC circuitry 120 is formed with an opening 122 at the top of the throttle body 102 and an outlet port 124 at the bottom of throttle body 102. An idle air control motor 126 is used to throttle the amount of air that flows through the bypass circuit 120 by varying the stem of an IAC valve 128 between open and shut positions.

Figure 2:
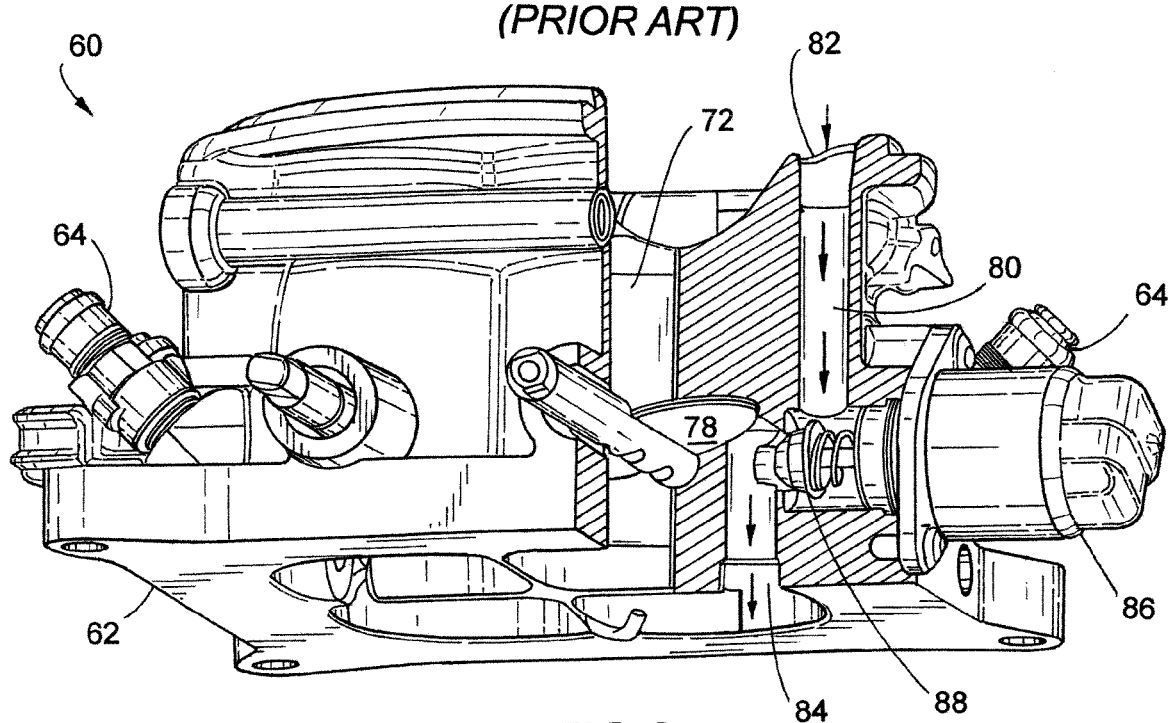
FIG. 2 is a perspective view of a throttle body fuel injection system of prior art with a broken-out section to reveal the detail of the idle air control circuit.

However, unlike the IAC circuitry 80 of the prior art throttle body fuel injection system of FIG. 2, IAC circuitry 120 includes one or more crossover inlet ports 121 that open between bores 112 below fuel injection ring 140 and IAC bypass circuit 120. Accordingly, when IAC circuit 80 is bypassing air around throttle plates 118, an air/fuel mixture is drawn from the region of bores 112 downstream of fuel injection rings 140 through ports 121 into the intake manifold (rather than drawing air only from upstream of the fuel injectors as is done in the prior art injection system of FIG. 2). By drawing an air fuel mixture into the IAC circuit 80, the propensity for a lean fuel mixture while idling is lessened. Opening 122 may be left open or may alternatively be plugged.

The tendency for a lean idle fuel mixture is also minimized by a unique ECU algorithm according to a preferred embodiment of the invention. ECU 132 (visible in FIG. 5) controls the position of IAC motor 126 as a function of one or more inputs, which may include engine rpm, engine load, throttle position, and coolant temperature, so that engine rpm at idle is maintained at a constant desired value regardless of engine load or temperature, for example. For instance, when the vehicle is idling at a traffic signal, if the air conditioning compressor is engaged, the IAC valve 128 may need to be nearly fully open in order to maintain desired engine speed, but if the air conditioning compressor is disengaged, the IAC valve may only need to be open twenty percent.

In prior art control systems, IAC motor position is not an input variable used in the determination of fuel injection levels. However, as illustrated in the block level schematic diagram of FIG. 7, ECU 132 employs a unique feed-forward algorithm that increases the pulse widths of the fuel injector signals based on the controlled movement of the IAC motor. This feature allows the initial open-loop-based fuel mixture supplied by system 100 to be more accurate than the initial open-loop-based fuel mixture supplied by prior art system 60 and eliminates rough unstable idle associated with the closed-loop lag times.

A computer processor 150, such as a microprocessor or microcontroller, is included within ECU 132. The computer processor 150 controls various engine and automotive systems as preprogrammed functions of numerous signals received from various sensors. Computer memory 152, which may include both random access memory (RAM) and non-volatile memory such as Flash memory or electrically erasable programmable read-only memory (EEPROM), is in electrical communication with computer processor 150 as is well known to those of ordinary skill in the art of computer system design. Discrete electronic components may be combined in an application-specific integrated circuit (ASIC) as appropriate.

Figure 8:
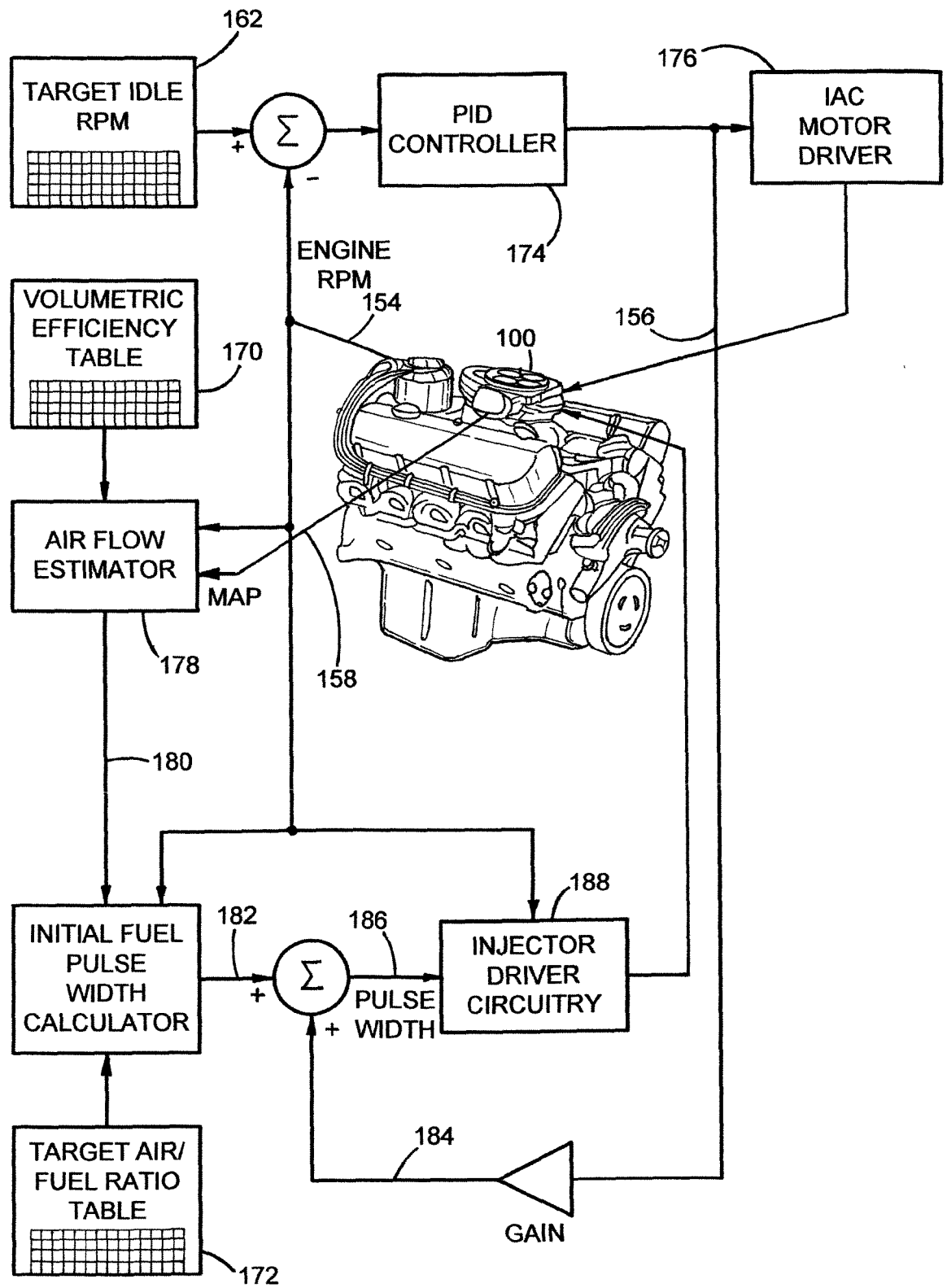
FIG. 8 is a flowchart diagram of the control system algorithm implemented by the engine control unit of FIG. 7 according to a preferred embodiment of the invention.

As described in greater detail with respect to FIG. 8, processor 150 executes an algorithm 160 for controlling the position of IAC motor 126 (FIG. 5) so as to maintain actual engine idle speed at specified idle target speed. Target idle RPM data 162 are stored in memory 152 and may provide specified idle target speeds as a function of coolant temperature, throttle position, air conditioner settings, or similar inputs. Processor 150 receives an engine speed input 154 and whatever other inputs (not illustrated) are appropriate for the particular IAC algorithm 160 that is implemented. Based on IAC algorithm 160, processor 150 generates an IAC position output signal 156, which is proportional to the shaft position of IAC motor 126. IAC position output signal is thereafter formatted and conditioned for actuating IAC motor 126 as appropriate.

Fuel injector pulsing is controlled by algorithm 164 primarily as a function of engine speed 154 and engine load 158 (e.g., MAP or mass air flow), as is known in the art. Other inputs (not illustrated) including exhaust oxygen levels, manifold air temperature, coolant temperature, and throttle position, may be used, depending on the control system topology. According to a preferred embodiment of the invention, fuel pulse algorithm 164 is unique in that it includes the IAC position output signal 156 as an input. Accordingly, processor 150 generates a fuel pulse width output signal 157 that in open-loop control immediately increases the fuel pulse width output signal 157 as the IAC valve 128 (FIG. 6) is opened without the lag time associated with closed-loop control based on oxygen sensor readings. The fuel pulse width output signal 157 is thereafter formatted and conditioned for actuating fuel injectors 104 (FIG. 6) as appropriate.

Figure 7:
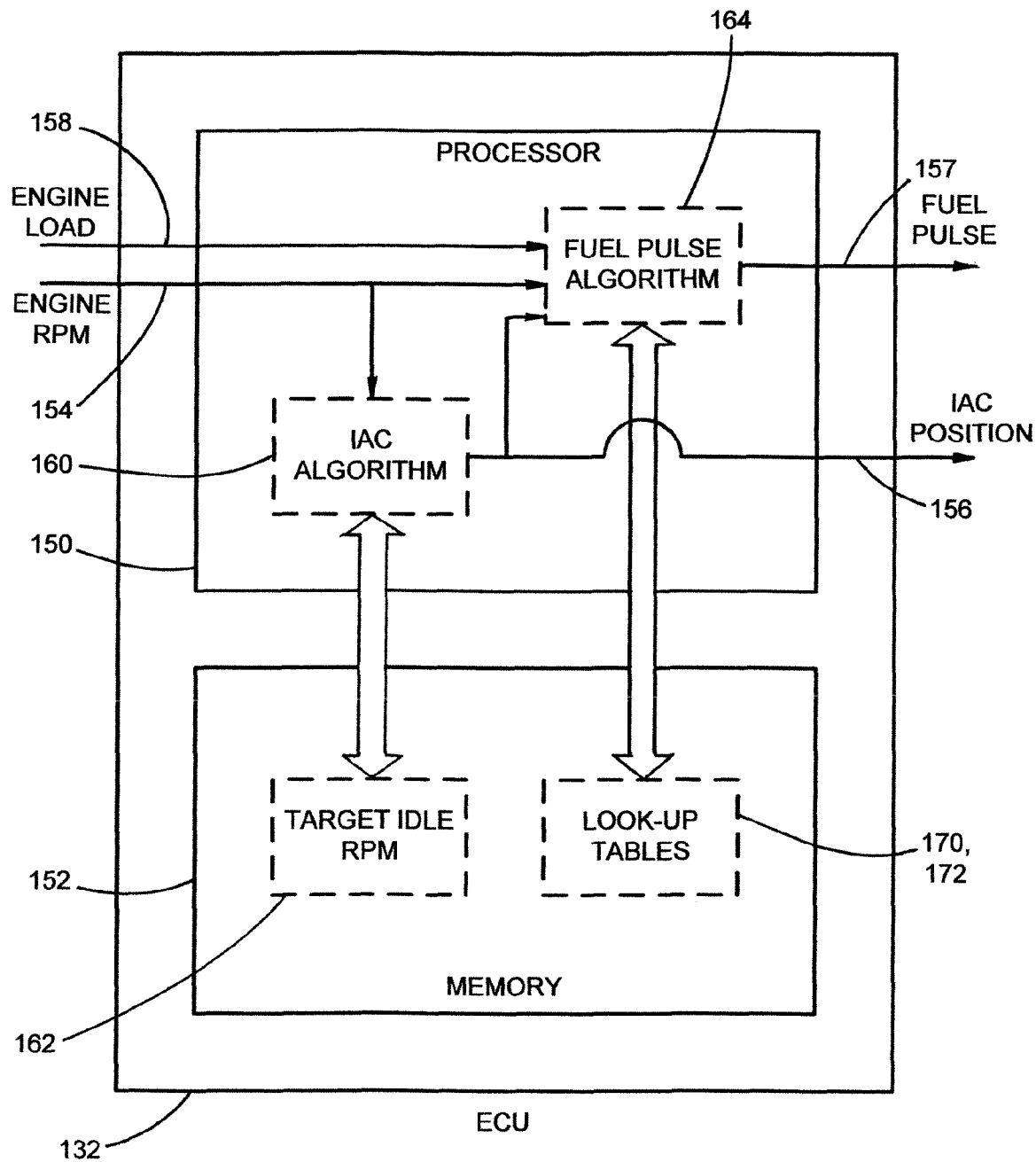
FIG. 7 is a block level schematic diagram of the engine control unit of the fuel injection system according to a preferred embodiment of the invention.

FIG. 8 is a flowchart diagram of the open-loop control system algorithm implemented by ECU 132 according to a preferred embodiment of the invention. Target idle speed data 162, volumetric efficiency data 170, and target air/fuel ratio data 172 are stored in memory 152 of ECU 132 (FIG. 7). According to IAC algorithm 160 (FIG. 7), the appropriate target idle rpm value from target idle speed data 162 is summed with the negative feedback of the actual engine rpm value 154, the result of which comprises the input to a proportional-integral-derivative (PID) controller algorithm 174. As PID controllers are well known in the art, no further details are provided herein. However, controller topologies other than PID may be used as appropriate. The output of PID controller 174 is a signal 156 that is proportional to the position of IAC motor 126 (FIG. 6). IAC position signal 156 is converted by an IAC motor driver circuit 176 into an appropriate signal that actuates IAC motor 126.

An airflow estimator algorithm 178 determines the mass air flow rate into the engine from engine speed 154 and manifold absolute pressure 158 based on the engine's volumetric efficiency factors 170. Other inputs (not illustrated), such as induction air temperature in the engine's intake manifold and barometric pressure may be used to more accurately determine mass air flow, as is known to routineers of ordinary skill in the art. Next, a fuel pulse width calculation algorithm 184 calculates from the mass air flow rate signal 180 and the target air/fuel ratio table 172 the fuel injection pulse width 182 required to add the required fuel mass to achieve the target air/fuel ratio for that engine speed and load.

According to a preferred embodiment of the invention, a "feed forward" signal 184 that is proportional to IAC position signal 156 is summed with the initial fuel injection pulse width signal 182 so as to add more fuel as the IAC valve 128 (FIG. 6) is opened. The combined fuel injection pulse width signal 186 is converted into a period waveform having a frequency based on the engine rpm signal 154 with suitable electrical characteristics to actuate fuel injectors 104 (FIG. 6) by injector driver circuitry 188.

The Abstract of the disclosure is written solely for providing the United States Patent and Trademark Office and the public at large with a way by which to determine quickly from a cursory reading the nature and gist of the technical disclosure, and it represents solely a preferred embodiment and is not indicative of the nature of the invention as a whole.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein:

What is claimed is:

1. A fuel injection system (100) comprising:
    a throttle body assembly (102) defining an outlet side that is dimensioned to mount atop an intake manifold of an internal combustion engine, said throttle body assembly having a bore (112) formed therethrough opening into said outlet side and including a throttle valve (118) disposed in said bore;
    a fuel injector (104) mounted to said throttle body assembly so as to inject fuel into said bore at a first point upstream of said throttle valve;
    an idle air control passage (120) formed through said throttle body defining an outlet port (124) in fluid communication with said bore at said outlet side, an opening (122) at a top of the throttle body opposite said outlet side, and an inlet port (121) in fluid communication with said bore at a second point that is downstream of said first point and upstream of said throttle valve; and
    an idle air control valve (128) disposed within said idle air control passage for selectively isolating said inlet port from said outlet port.

2. The fuel injection system of claim 1 further comprising:
    a controller (132) operatively coupled to said fuel injector and arranged for increasing an amount of fuel injected by said fuel injector as a function of a position of said idle air control valve.

3. The fuel injection system of claim 2 wherein:
said controller (132) includes driver circuitry (188) for creating a periodic pulse signal to actuate said fuel injector; and
said controller (132) includes a first algorithm for determining a pulse width (186) of said periodic pulse signal as a function of the sum of a first value (182) that is representative of an initial fuel pulse width and a second value (184) that is representative of a position of said idle air control valve.

4. The fuel injection system of claim 3 wherein:
said controller (132) includes a second algorithm for determining said first value from a third value (180) that is representative of an air flow into said internal combustion engine and a fourth value (172) that is representative of a target air/fuel ratio.

5. The fuel injection system of claim 4 wherein:
said controller (132) includes a third algorithm for determining said third value from a fifth value (154) that is representative of a rotational speed of said internal combustion engine, a sixth value (158) that is representative of a load imposed on said internal combustion engine, and a seventh value (170) that is representative of a volumetric efficiency of said internal combustion engine.

6. A fuel injection system (100) comprising:
a throttle body assembly (102) defining an outlet side that is dimensioned to mount atop an intake manifold of an internal combustion engine, said throttle body assembly having a bore (112) formed therethrough opening into said outlet side and including a throttle valve (118) disposed in said bore;
a fuel injector (104) mounted to said throttle body assembly so as to inject fuel into said bore at a first point upstream of said throttle valve; and
an idle air control circuit (120) formed through said throttle body so as to selectively bypass said throttle valve, said idle air control circuit having an inlet opening (121) in said bore at a location downstream of said first point and an opening (122) at a top of said throttle body assembly opposite said outlet side.

7. The fuel injection system of claim 6 further comprising:
an idle air control valve (128) disposed within said idle air control circuit for selectively bypassing said throttle valve.

8. The fuel injection system of claim 7 further comprising:
an idle air control motor (126) connected to said idle air control valve for actuating said idle air control valve; and
a controller (132) operatively coupled to said fuel injector and arranged for increasing an amount of fuel injected by said fuel injector as a function of a position of said idle air control valve.

9. The fuel injection system of claim 8 wherein:
said controller (132) includes driver circuitry (188) for creating a periodic pulse signal to actuate said fuel injector; and
said controller (132) includes a first algorithm for determining a pulse width (186) of said periodic pulse signal as a function of the sum of a first value (182) that is representative of an initial fuel pulse width and a second value (184) that is representative of a position of said idle air control valve.

10. The fuel injection system of claim 9 wherein:
said controller (132) includes a second algorithm for determining said first value from a third value (180) that is representative of an air flow into said internal combustion engine and a fourth value (172) that is representative of a target air/fuel ratio.

11. The fuel injection system of claim 10 wherein:
said controller (132) includes a third algorithm for determining said third value from a fifth value (154) that is representative of a rotational speed of said internal combustion engine, a sixth value (158) that is representative of a load imposed on said internal combustion engine, and a seventh value (170) that is representative of a volumetric efficiency of said internal combustion engine.

12. A fuel injection system (100) comprising:
a throttle body assembly (102) defining an outlet side that is dimensioned to mount atop an intake manifold of an internal combustion engine, said throttle body assembly having a bore (112) formed therethrough opening into said outlet side and including a throttle valve (118) disposed in said bore;
a fuel injector (104) mounted to said throttle body assembly so as to inject fuel into said bore at a first point upstream of said throttle valve having first axial distance from said outlet side;
an idle air control passage (120) formed through said throttle body defining an outlet port (124) in fluid communication with said bore at said outlet side, an opening (122) at a top of said throttle body assembly opposite said outlet side and an inlet port (121) in fluid communication with said bore at a second point that is downstream of said first point and upstream of said throttle valve;
an idle air control valve (128) disposed within said idle air control passage; and
a controller (132) operatively coupled to said fuel injector and arranged for increasing an amount of fuel injected by said fuel injector as a function of a position of said idle air control valve.

13. The fuel injection system of claim 12 wherein:
said controller (132) includes driver circuitry (188) for creating a periodic pulse signal to actuate said fuel injector; and
said controller (132) includes a first algorithm for determining a pulse width (186) of said periodic pulse signal as a function of the sum of a first value (182) that is representative of an initial fuel pulse width and a second value (184) that is representative of a position of said idle air control valve.

14. The fuel injection system of claim 13 wherein:
said controller (132) includes a second algorithm for determining said first value from a third value (180) that is representative of an air flow into said internal combustion engine and a fourth value (172) that is representative of a target air/fuel ratio.

15. The fuel injection system of claim 14 wherein:
said controller (132) includes a third algorithm for determining said third value from a fifth value (154) that is representative of a rotational speed of said internal combustion engine, a sixth value (158) that is representative of a load imposed on said internal combustion engine, and a seventh value (170) that is representative of a volumetric efficiency of said internal combustion engine.

* * * * *